United States Patent
Azuma et al.

(10) Patent No.: US 8,041,966 B2
(45) Date of Patent: Oct. 18, 2011

(54) ELECTRIC POWER SUPPLY SYSTEM, TERMINAL, ELECTRIC POWER SUPPLY METHOD AND COMPUTER READABLE MEDIUM

(75) Inventors: Kouichi Azuma, Ebina (JP); Taketoshi Yamaguchi, Atsugi (JP); Yukio Yamazaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 943 days.

(21) Appl. No.: 11/812,349

(22) Filed: Jun. 18, 2007

(65) Prior Publication Data
US 2008/0148079 A1    Jun. 19, 2008

(30) Foreign Application Priority Data

Dec. 15, 2006    (JP) .................................. 2006-338591

(51) Int. Cl.
G06F 1/26 (2006.01)
G06F 1/32 (2006.01)

(52) U.S. Cl. ........ 713/310; 713/300; 713/330; 713/340; 327/260

(58) Field of Classification Search .................. 713/300, 713/310, 330, 340; 327/260
See application file for complete search history.

(56) References Cited

U.S. PATENT DOCUMENTS

| 6,678,829 B1 * | 1/2004 | Teggatz et al. ................ 713/300 |
| 7,154,553 B2 | 12/2006 | Horii et al. |
| 7,328,355 B2 | 2/2008 | Arakawa |
| 2006/0053324 A1 * | 3/2006 | Giat et al. ..................... 713/300 |
| 2008/0005395 A1 * | 1/2008 | Ong et al. ....................... 710/36 |

FOREIGN PATENT DOCUMENTS

| JP | A-10-091292 | 4/1998 |
| JP | 2000-324717 A | 11/2000 |
| JP | A-2001-209515 | 8/2001 |
| JP | A-2002-95181 | 3/2002 |
| JP | A 2002-142385 | 5/2002 |
| JP | A-2004-048895 | 2/2004 |
| JP | A-2004-310304 | 11/2004 |
| JP | A-2005-100096 | 4/2005 |
| JP | A-2005-338986 | 12/2005 |

OTHER PUBLICATIONS

Office Action issued in CN Application No. 200710147801.0 on Aug. 4, 2010 (with English translation).
Mar. 29, 2011 English Translation of Office Action issued in Japanese Patent Application No. 2006-338591.

* cited by examiner

Primary Examiner — Thomas Lee
Assistant Examiner — Michael J Brown
(74) Attorney, Agent, or Firm — Oliff & Berridge, PLC (57) ABSTRACT

The electric power supply system includes a first terminal that electric power is supplied thereto from a first power supply to operate, a second terminal that is connected to the first terminal and that electric power is supplied thereto from a second power supply to operate, and a controller that controls electric power supply so as to supply electric power from the first terminal to the second terminal based on the operation state of the first terminal.

20 Claims, 10 Drawing Sheets

ELECTRIC POWER SUPPLY SYSTEM, TERMINAL, ELECTRIC POWER SUPPLY METHOD AND COMPUTER READABLE MEDIUM

CROSS REFERENCE TO RELATED APPLICATION

This application is based on and claims priority under 35 USC 119 from Japanese Patent Application No. 2006-338591 filed Dec. 15, 2006.

BACKGROUND

1. Technical Field

The present invention relates to an electric power supply system, a terminal, an electric power supply method, and a computer readable medium storing a program.

2. Related Art

The related art which realizes stable operation of the whole system by managing the amount of power consumption of an apparatus connected to a network is disclosed.

SUMMARY

According to an aspect of the invention, there is provided an electric power supply system including a first terminal that electric power is supplied thereto from a first power supply to operate, a second terminal that is connected to the first terminal and that electric power is supplied thereto from a second power supply to operate, and a controller that controls electric power supply so as to supply electric power from the first terminal to the second terminal based on an operation state of the first terminal.

BRIEF DESCRIPTION OF THE DRAWINGS

Exemplary embodiment(s) of the present invention will be described in detail based on the following figures, wherein.

DETAILED DESCRIPTION

Figure 1:
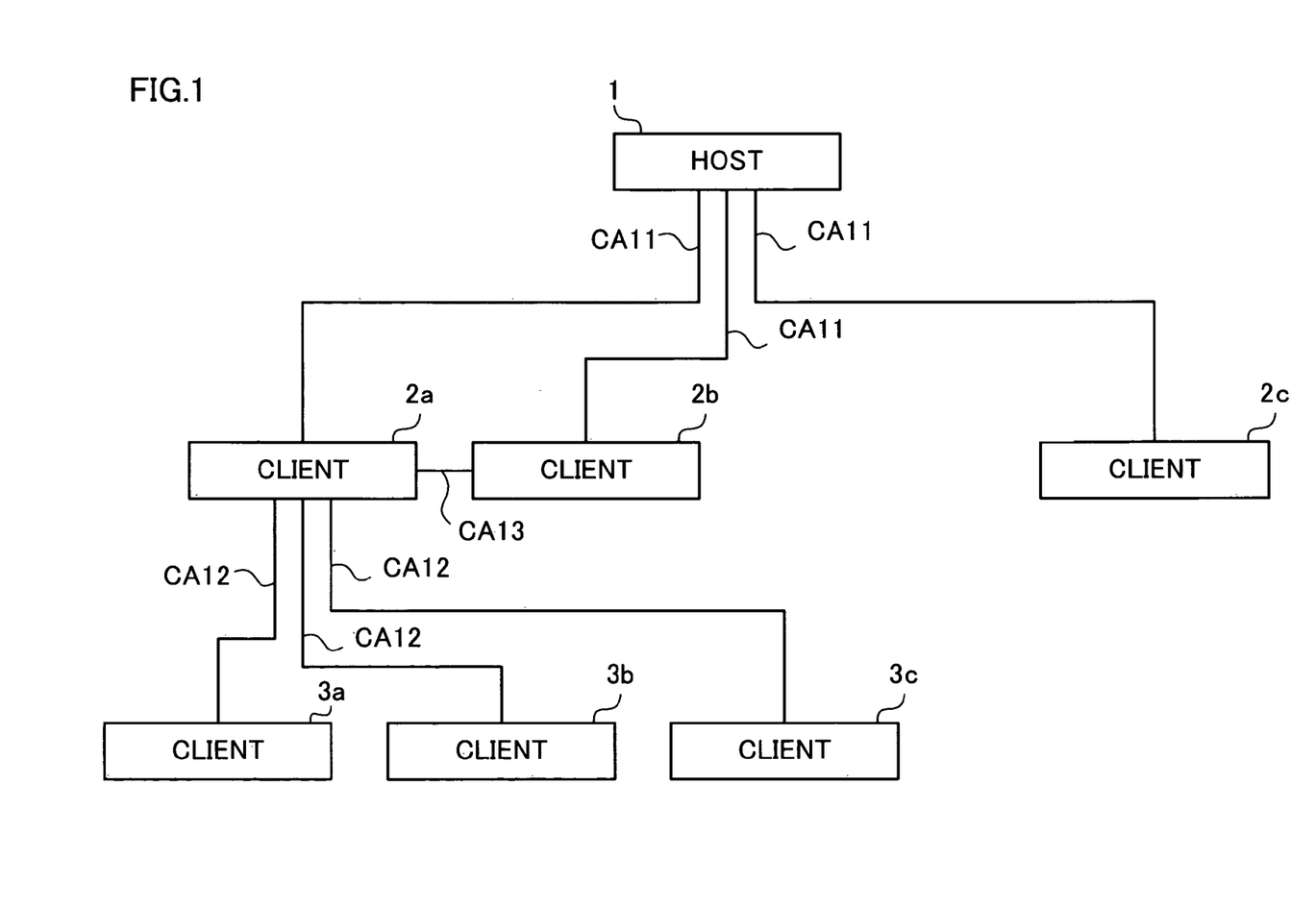
FIG. 1 is a schematic diagram illustrating a configuration of a management system according to the exemplary embodiment.

Hereinafter, an exemplary embodiment of the invention will be described in detail with reference to the drawings;

FIG. 1 is a schematic diagram illustrating a configuration of a management system according to the exemplary embodiment.

As shown in FIG. 1, client computers (hereinafter 'clients') (higher-level client units, terminals) 2a, 2b and 2c are connected to a host computer (hereinafter 'host') (an information processor, a computer, a server, an external unit) 1 through a cable CA11.

Further, clients (lower-level client units) 3a, 3b and 3c are connected to the client 2a through a cable CA12. As described above, in the exemplary embodiment, a tree-structured network system is indicated. Such network system may be installed, for example, in an office.

Furthermore, the client 2a is connected to the client 2b as a local network system through a cable CA13.

The host 1 may be configured as, for example, a computer, a switching hub supplying power to a communication line, or the like. The clients 2a to 2c and the clients 3a to 3c may be configured as office devices, specifically for example, image forming apparatuses, printers, personal computers, or various home electric appliances connected to the network. In this exemplary embodiment, the host 1 and the clients 2a to 2c and the clients 3a to 3c are described by clearly differentiating their function, but there may be a case that the host 1 itself may take the function of the clients 2a to 2c and the clients 3a to 3c.

Each of the cables (net cable) CA11, CA12, and CA13 described herein may be used as a cable formed of a pair of a data communication line and a power supply line. In this case, data is sent and received between the host 1 and the clients 2a to 2c through the data communication line of the cable CA11. Data is sent and received between the client 2c and the clients 3a to 3c through the data communication line of the cable CA12. The host 1 supplies electric power to the clients 2a to 2c through the power supply line of the cable CA11 and the client 2c supplies electric power to the clients 3a to 3c through the power supply line of the cable CA12. As described above, the devices are respectively connected by a cable CA11, CA12 or CA13 through which the data is sent and received and electric power is supplied. In other words, the host 1, the clients 2a to 2c and the clients 3a to 3c are connected to a power supply network as a tree-structured network system.

By the power supply lines of the cables CA11, CA12, and CA13, for example, it is possible to supply electric power of the maximum 12.95 W at an input voltage in the range of 36 to 57 V. For this reason, a low-power device may be operated without an internal power supply. An image forming apparatus as the clients 2a to 2c in the exemplary embodiment has an AC power supply as a driving power supply in addition to the power supply lines of the cables CA11, CA12, and CA13. It may be considered that a technique of supplying electric power meets the standard specification called IEEE 802.3af, which supplies electric power to the clients 2a to 2c and the clients 3a to 3c or sends and receives the data through the power supply network such as Power-over-Ethernet (registered trademark).

In addition, Ethernet (registered trademark) that is capable of communicating data without supplying electric power may be used as the cables CA11 and CA12. An electric cord for supplying electric power may be used as the cable CA13.

First Exemplary Embodiment

Figure 2:
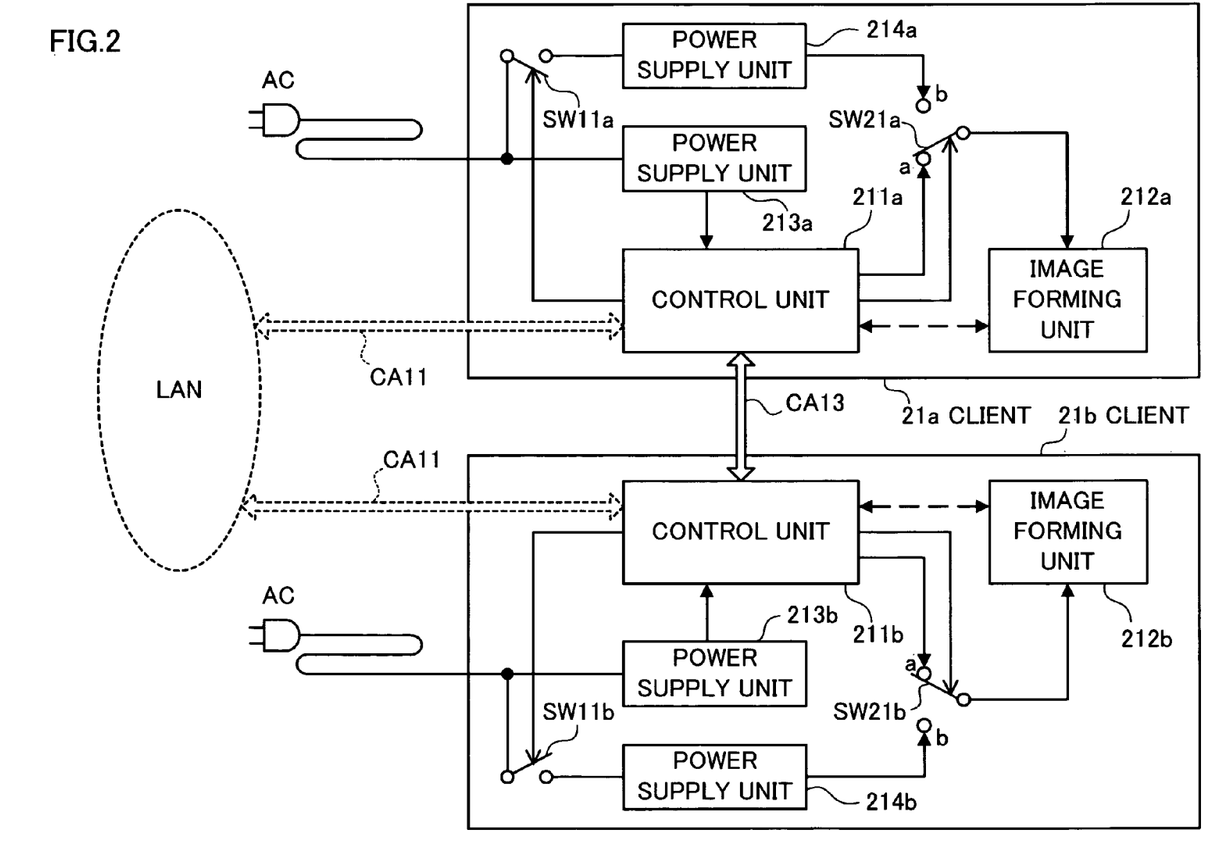
FIG. 2 is a block diagram illustrating a configuration of a client (first terminal) and a client (second terminal) according to the first exemplary embodiment.

FIG. 2 is a block diagram illustrating a configuration of a client (first terminal) 21a and a client (second terminal) 21b according to the first exemplary embodiment. The client 21a and the client 21b have the same configurations. Hence, reference numerals used in the same unit in the configuration are the same except for the character at the end. Hereinafter, the configuration of the client 21a will be described, and detailed descriptions of the configuration of the client 21b will be omitted.

As shown in FIG. 2, the client 21a includes a control unit (controller) 211a, an image forming unit 212a, two power supply units 213a and 214a, and two switches SW11a and SW21a. The switch SW11a is disposed between an AC power supply (not shown in FIG. 2) and the power supply unit 214a. In other words, the switch SW11a is disposed on the input end of the power supply unit 214a. The switch SW21a has two contact points A and B. In addition, the switches SW11a and SW21a are switched by the control of the control unit 211a.

In this case, solid-line arrows in the client 21a shown in FIG. 2 indicate power supply paths. Specifically, the power supply unit 213a supplies electric power to the control unit 211a. Further, the control unit 211a is connected to the contact point A of the switch SW21a. Thus, when the switch SW21a is switched to the contact point A, the control unit 211a supplies electric power to the image forming unit 212a. Furthermore, the power supply unit 214a is connected to the contact point B of the switch SW21a. Hence, when the switch SW11a is turned on and the switch SW21a is switched to the contact point B by the control unit 211a, electric power is supplied to the image forming unit 212a.

A broken-line arrow between the control unit 211a and the image forming unit 212a indicates a data communication path. Further, double-line arrow between the control unit 211a and the control unit 211b indicates the cable CA13 through which data is communicated and electric power is supplied. Furthermore, a broken double-line arrow between the control unit 211a and a LAN (Local Area Network) indicates Ethernet (registered trademark).

Figure 3:
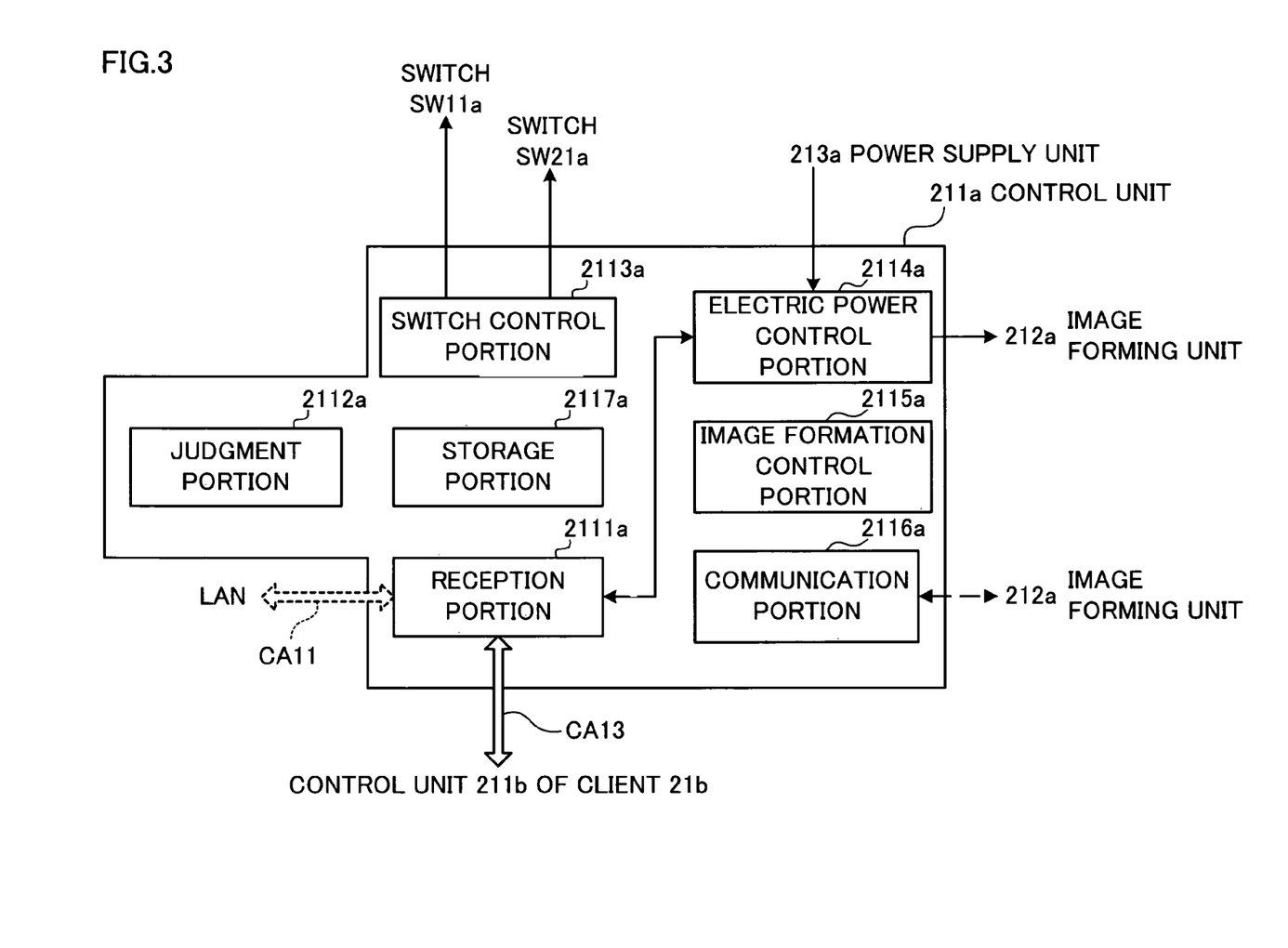
FIG. 3 is a block diagram illustrating a configuration of the control unit.

FIG. 3 is a block diagram illustrating a configuration of the control unit 211a. The control unit 211a and the control unit 211b have the same configurations. Therefore, detail description of the configuration of the control unit 211b will be omitted.

As shown in FIG. 3, the control unit 211a may be configured as, for example, a CPU, a memory, or the like. Even when the control unit 211a is in a lower consumption mode of electric power, which is a so-called sleep mode state, electric power is supplied from the power supply unit 213a. In addition, the control unit 211a controls communicating with LANs or the like, or controls operations of the image forming unit 212a. Specifically, the control unit 211a includes a reception portion (request unit) 2111a, a judgment portion 2112a, a switch control portion 2113a, an electric power control portion 2114a, an image formation control portion 2115a, a communication portion 2116a and a storage portion 2117a.

The reception portion 2111a sends information to external devices through the cable CA11, and receives the information from external devices through the cable CA11. The reception portion 2111a also sends information to the control unit 211b of the client 21b (see FIG. 2) through the cable CA13, and receives information from the control unit 211b of the client 21b through the cable CA13. The judgment portion 2112a makes a certain judgment based on the information obtained from the reception portion 2111a and the communication portion 2116a, and then, if necessary, the judgment portion 2112a instructs to the switch control portion 2113a or the other portions, and stores the judgment results in the storage portion 2117a.

The switch control portion 2113a controls to turn the switch SW11a (see FIG. 2) on and to turn the switch SW11a off, and also controls to switch the switch SW21a between the contact points A and B (see FIG. 2), based on the instructions of the judgment portion 2112a.

The electric power control portion 2114a controls, based on the instructions of the judgment portion 2112a, whether electric power supplied from the power supply unit 213a is supplied to the client 21b through the cable CA13 or electric power supplied from the client 21b through the cable CA13 is supplied to the image forming unit 212a.

Further, the image formation control portion 2115a controls the image forming unit 212a through the communication portion 2116a based on the instructions of the judgment portion 2112a. Furthermore, the communication portion 2116a sends information to the image forming unit 212a and receives information from the image forming unit 212a. Then, if necessary, the image forming unit 212a sends the received information to the image formation control portion 2115a or the judgment portion 2112a. The storage portion 2117a stores any information or reads stored information to send to the judgment portion 2112a, based on the instructions of the judgment portion 2112a.

Figure 4:
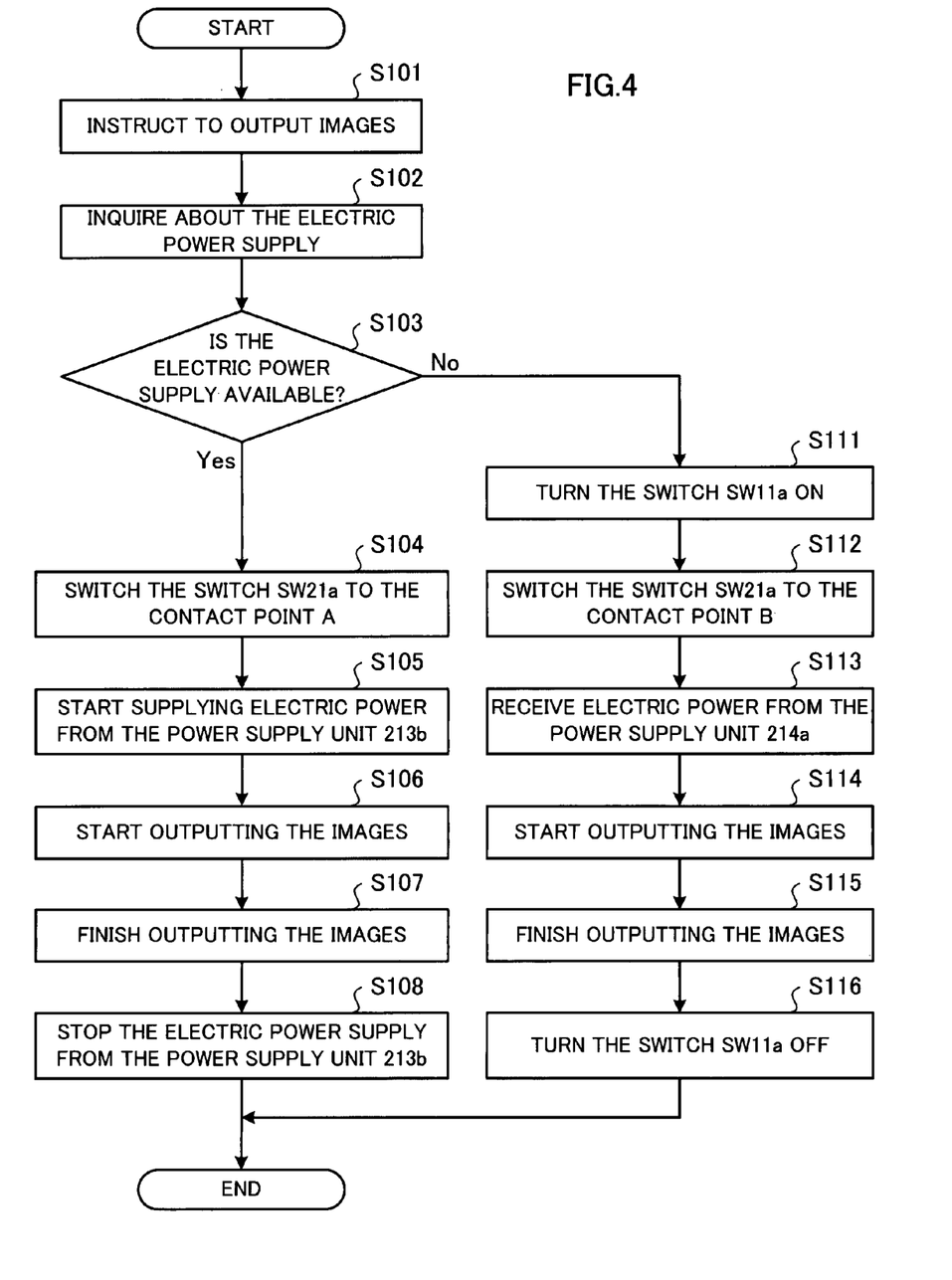
FIG. 4 is a flowchart illustrating a process sequence in the clients.

FIG. 4 is a flowchart illustrating a process sequence in the clients 21a and 21b. The client 21a is in a so-called sleep state, since the power supply unit 213a is on and the power supply unit 214a is off. Further, the client 21b is in a so-called standby state, since the power supply unit 213b is on and the power supply unit 214b is on. That is, the client 21a is in the state in which the client 21a does not immediately output images, since the client 21a does not supply electric power to a fixing portion (not shown in figures) of the image forming unit and therefore it takes much time to reach a predetermined temperature. On the other hand, the client 21b is in a state in which the client 21b immediately outputs images.

In such a state, when the reception portion 2111a of the client 21a (see FIG. 3) receives instructions to output images through a cable CA11 (step 101), the reception portion 2111a sends the instructions to the judgment portion 2112a. Then, the judgment portion 2112a confirms the state of the client 21a. When the judgment portion 2112a confirms that the client 21a is in a sleep state, the judgment portion 2112a performs a process for determining the power supply for electric power consumed by motors, solenoids, sensors and heaters of the fixing portion and the like that are installed in the image forming unit 212a, in order to output images. In other words, the judgment portion 2112a determines whether as a power supply, the power supply unit 214a of the client 21a will be used, or the power supply unit 213b of the client 21b will be used. The data about outputting the images, which has been received by the reception portion 2111a, is temporarily stored in the storage portion 2117a.

Hence, the judgment portion 2112a inquires about the electric power supply of the client 21b through the reception portion 2111a (step 102). Specifically, the judgment portion 2112a inquires of the client 21b whether or not the electric power supply through the cable CA13 is available. The client 21b judges whether or not the electric power supply is available (step 103). In other words, the client 21b judges whether or not surplus electric power of the client 21b is capable to be supplied. When the client 21b is in a standby state and therefore has any surplus electric power, the client 21b informs the client 21a through the cable CA13 that electric power supply is available.

Also, the judgment portion 2112a that has received the information that the electric power supply is available determines to receive electric power from the power supply unit 213b of the client 21b. In other words, the judgment portion 2112a requests the control unit 211b of the client 21b to supply electric power through the reception portion 2111a and through the cable CA13. Further, the judgment portion 2112a instructs the switch control portion 2113a to switch the switch SW21a to the contact point A. The instructed switch control portion 2113a switches the switch SW21a to the contact point A (step 104), and then informs the judgment portion 2112a that the instructed operation has been done. The judgment portion 2112a instructs the client 21b to start supplying electric power through the reception portion 2111a, and then the client 21b that has been instructed starts supplying the surplus electric power of the power supply unit 213b through the cable CA13 (step 105).

In this case, electric power supplied through the cable CA13 is transmitted from the reception portion 2111a to the electric power control portion 2114a and then electric power is supplied to the image forming unit 212a. In addition, the image formation control portion 2115a instructs the image forming unit 212a to start outputting images through the communication portion 2116a. Then, the instructed image forming unit 212a starts outputting of images (step 106).

When the instructed all images are output, the image formation control portion 2115a informs the judgment portion 2112a that the instructed operation is done and finishes outputting the images (step 107). The judgment portion 2112a that has received the information informs the client 21b through the reception portion 2111a of stopping the electric power supply, and thereby the electric power supply from the power supply unit 213b of the client 21b is stopped (step 108).

On the other hand, in the step 103, when the electric power supply from the client 21b through the cable CA13 is not available, the client 21b informs the client 21a through the cable CA13 that the electric power supply is not available. The judgment portion 2112a that has received the information determines to use the power supply unit 214a of the client 21a as a power supply. Then, the judgment portion 2112a instructs the switch control portion 2113a to control the switch SW11a and the switch SW21a. In other words, the judgment portion 2112a instructs to turn the switch SW11a on and instructs to switch the switch SW21a to the contact point B. The instructed switch control portion 2113a turns the switch SW11a on (step 111) and switches the switch SW21a to the contact point B (step 112). Thereby, electric power is supplied from the power supply unit 214a to the image forming unit 212a (step 113). When the switch SW21a is already switched to the contact point B, it is not necessary to switch the switch SW21a.

Thereafter, the same process that is described in the aforementioned step 106 is performed as step 114, and then the same process that is described in the aforementioned step 107 is performed as step 115.

When the output of the images is completed in the step 115, the judgment portion 2112a instructs the switch control portion 2113a to turn the switch SW11a off. The switch control portion 2113a that has been instructed turns the switch SW11a off (step 116), and thereby suppresses the electric power consumption. Thus, a sequence of processes is completed.

As described above, in the exemplary embodiment, the client 21a is configured so as to supply electric power supplied from the client 21b to the control unit 211a or the image forming unit 212a. It may be considered that the client 21a is configured so as to supply electric power supplied from the client 21b to a part of the control unit 211a or a part of the image forming unit 212a. Further, in the exemplary embodiment, electric power is supplied to the control unit 211a from the power supply unit 213a. It may be considered that electric power is supplied from any one of the power supply unit 213a and the power supply unit 214a.

Furthermore, in the exemplary embodiment, while the case that the client 21b supplies electric power to the client 21a through the cable CA13 is described as an example, on the contrary, the exemplary embodiment may also be applied to the case that the client 21a supplies electric power to the client 21b through the cable CA13.

In the exemplary embodiment, the case that the data communication line and the power supply line are configured as a pair is described as an example, the same effect will be obtained even though electric power is superposed on the data communication line. In addition, as the cable CA11, while Ethernet (registered trademark) is used, Power Over Ethernet (registered trademark) may be used instead.

Second Exemplary Embodiment

Figure 5:
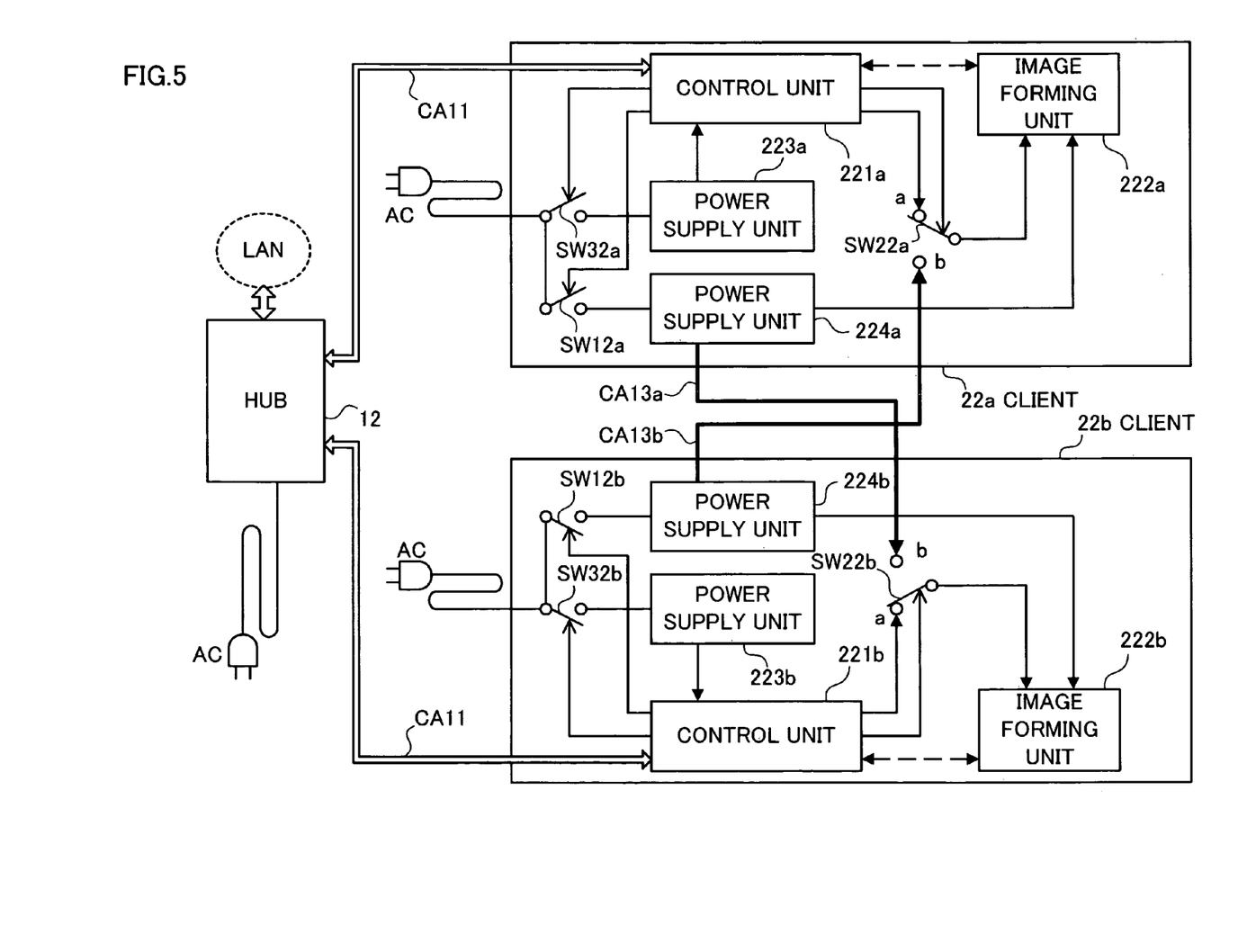
FIG. 5 is a block diagram illustrating configurations of clients according to the second exemplary embodiment.

FIG. 5 is a block diagram illustrating configurations of clients 22a and 22b according to the second exemplary embodiment. The client 22a and the client 22b have the same configurations. Hence, reference numerals used in the same unit in the configuration are the same except for the character at the end. Hereinafter, the configuration of the client 22a will be described in detail, and the detailed description of the configuration of the client 22b may be omitted in some cases.

As shown in FIG. 5, the client 22a includes a control unit 221a, an image forming unit 222a, two power supply units 223a and 224a, and three switches SW12a, SW22a and SW32a. The switch SW12a is disposed on an input end of the power supply unit 224a. The switch SW22a has two contact points A and B. The switch SW32a is disposed on an input end of the power supply unit 223a. In addition, the switches SW12a, SW22a and SW32a are switched under the control of the control unit 221a.

Further, the client 22b includes a control unit 221b, an image forming unit 222b, two power supply units 223b and 224b, and three switches SW12b, SW22b and SW32b. The switches SW12b, SW22b and SW32b are switched under the control of the control unit 221b.

In the exemplary embodiment, a data communication line and a power supply line are configured as a pair, and used as the cable CA11. Furthermore, the electric cord is used as the cables CA13a and CA 13b.

Electric power is supplied from a HUB 12 to the control unit 221a of the client 22a through the cable CA11. Similarly, electric power is supplied from the HUB 12 to the control unit 221b of the client 22b through the cable CA11.

In this case, solid-line arrows in the client 22a and clients 22b shown in FIG. 5 indicate power supply paths. Specifically, in the client 22a, when the switch SW32a is turned on by the control unit 221a, the power supply unit 223a, instead of the HUB 12, supplies electric power to the control unit 221a. In addition, since the control unit 221a is connected to the contact point A of the switch SW22a, the control unit 221a supplies electric power to the image forming unit 222a, when the switch SW22a is switched to the contact point A by the control unit 221a. Similarly, in the client 22b, when the switch SW32b is turned on and the switch SW22b is switched to the contact point A by the control unit 221b, the power supply unit 223b supplies electric power to the image forming unit 222b through the control unit 221b.

In the client 22a, when the switch SW12a is turned on by the control unit 221a, the power supply unit 224a supplies electric power to the image forming unit 222a. Similarly, in the client 22b, when the switch SW12b is turned on by the control unit 221b, the power supply unit 224b supplies electric power to the image forming unit 222b.

Further, the power supply unit 224a of the client 22a is connected to the contact point B of the switch SW22b of the client 22b through the cable CA13a. Hence, when the switch SW12a of the client 22a is turned on and the switch SW22b of the client 22b is switched to the contact point B, electric power is supplied from the power supply unit 224a of the client 22a to the image forming unit 222b of the client 22b through the cable CA13a.

Similarly, the power supply unit 224b of the client 22b is connected to the contact point B of the switch SW22a of the client 22a through the cable CA13b. Hence, when the switch SW12b of the client 22b is turned on and the switch SW22a of the client 22a is switched to the contact point B, electric power is supplied from the power supply unit 224b of the client 22b to the image forming unit 222a of the client 22a through the cable CA13b.

In addition, broken-line arrows in the clients 22a and 22b shown in FIG. 5 indicate data communication paths. That is, the broken-line arrow between the control unit 221a and the image forming unit 222a in the client 22a indicates a data communication path, and the broken-line arrow between the control unit 221b and the image forming unit 222b in the client 22b indicates a data communication path.

Further, double-line arrows between the HUB 12 and the control unit 221a of the client 22a, and between the HUB 12 and the control unit 221b of the client 22b indicate the connections through Power over Ethernet (registered trademark). That is, a data communication path is established between them. Therefore, the HUB 12 sends data to the control unit 221a and to the control unit 221b, and receives data from the control unit 221a and from the control unit 221b, as necessary. For example, the HUB 12 instructs the timing of switching the switches SW12a, SW22a, SW32a, SW12b, SW22b and SW32b.

Figure 6:
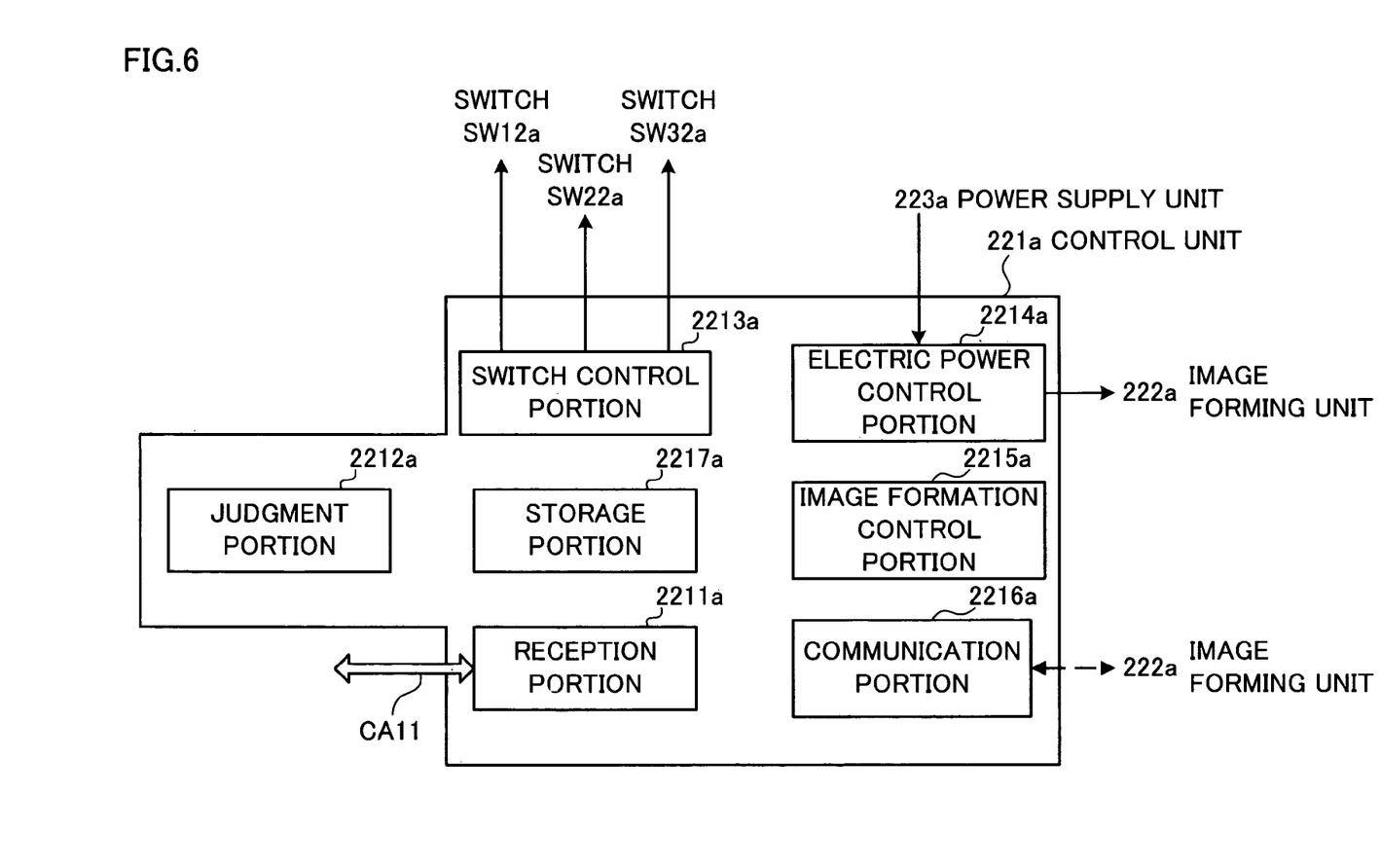
FIG. 6 is a block diagram illustrating a configuration of the control unit.

FIG. 6 is a block diagram illustrating a configuration of the control unit 221a. The control unit 221a and the control unit 221b have the same configurations. Therefore, detailed description of the configuration of the control unit 221b will be omitted.

As shown in FIG. 6, the control unit 221a may be configured as, for example, a CPU, a memory, or the like, and is supplied electric power from the HUB 12 (see FIG. 5) or the power supply unit 223a. In addition, the control unit 221a controls communicating with LANs or the like, or controls operations of the image forming unit 222a. Specifically, the control unit 221a includes a reception portion 2211a, a judgment portion 2212a, a switch control portion 2213a, an electric power control portion 2214a, an image formation control portion 2215a, a communication portion 2216a and a storage portion 2217a.

The reception portion 2211a sends information and electric power to external devices through the cable CA11 and receives information and electric power from external devices through the cable CA11. Further, the judgment portion 2212a makes a predetermined judgment based on the information obtained from the reception portion 2211a and the communication portion 2216a, and then, issues instructions to the switch control portion 2213a or the other portions, and stores the judgment results in the storage portion 2217a, if necessary.

The switch control portion 2213a controls to turn the switches SW12a and SW32a (see FIG. 5) on and to turn the switches SW12a and SW32a off, and also controls to switch the switch SW22a (see FIG. 5) between the contact points A and B, based on the instructions of the judgment portion 2212a.

Electric power is supplied from the power supply unit 223a (see FIG. 5) to the electric power control portion 2214a based on instructions of the judgment portion 2212a. Further, the electric power control portion 2214a supplies electric power supplied from the power supply unit 223a to the image forming unit 222a based on the instructions of the judgment portion 2212a.

The image formation control portion 2215a controls the image forming unit 222a through the communication portion 2216a based on the instructions of the judgment portion 2212a. The communication portion 2216a sends information to the image forming unit 222a and receives information from the image forming unit 222a. Then, if necessary, the communication portion 2216a sends the received information to the image formation control portion 2215a or the judgment portion 2212a. The storage portion 2217a stores any information, or reads stored information to send to the judgment portion 2212a, based on the instructions of the judgment portion 2212a.

Figure 7:
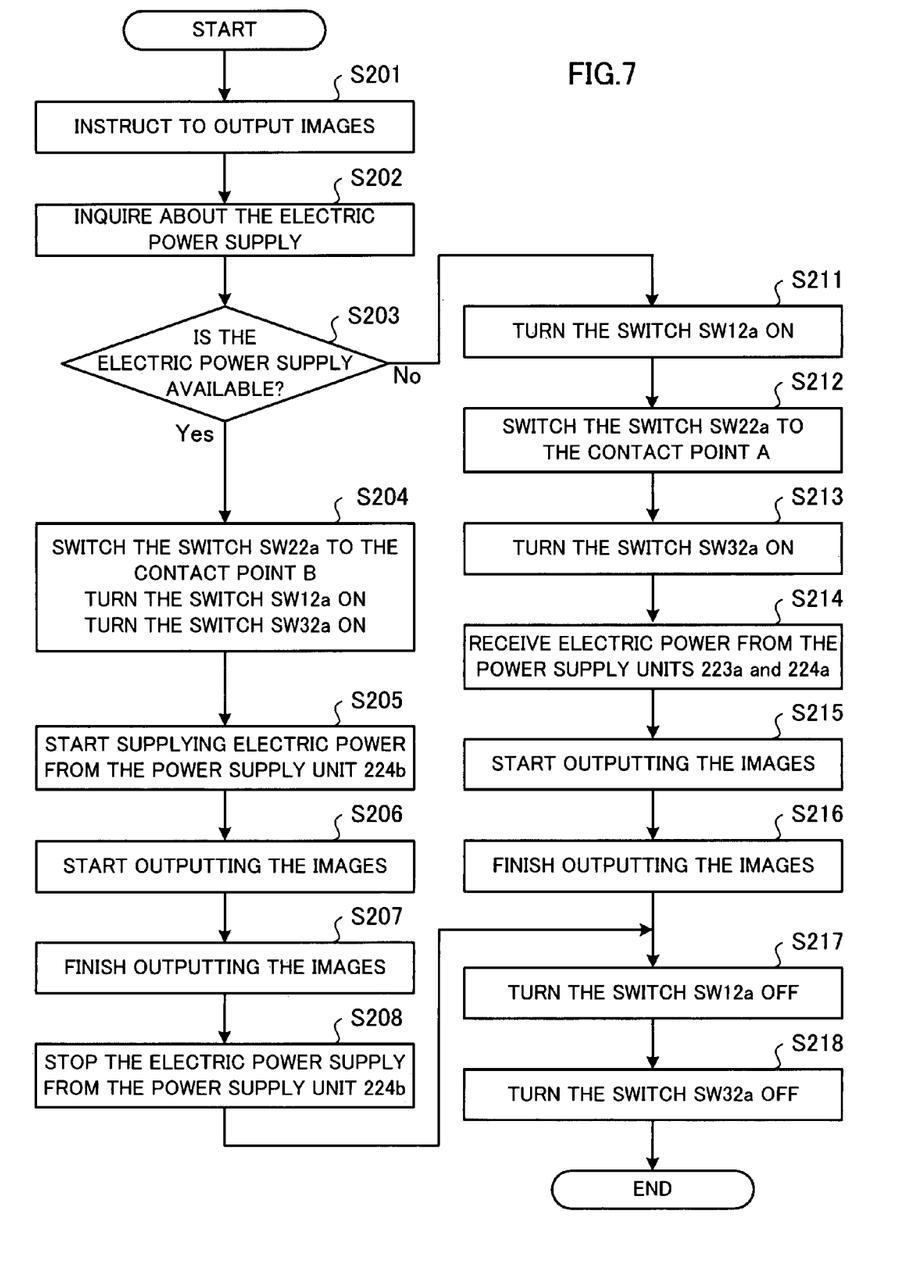
FIG. 7 is a flowchart illustrating a process sequence in the clients.

FIG. 7 is a flowchart illustrating a process sequence in the clients 22a and 22b.

The client 22a is in a so-called sleep state, since both the power supply unit 223a and the power supply unit 224a are off. The control unit 221a of the client 22a is supplied electric power from the HUB 12 through the cable CA11, and the control unit 221a constantly monitors instructions of outputting images through the cable CA11. Further, the client 22b is in a so-called standby state, since both the power supply unit 223b and the power supply unit 224b are on. That is, the client 22a is in the state in which the client 22a does not immediately output images, and the client 22b is in a state in which the client 22b immediately outputs images.

In such a state, when the reception portion 2211a of the client 22a (see FIG. 6) receives instructions to output images through the cable CA11 (step 201), the reception portion 2211a sends the instructions to the judgment portion 2212a. Then, the judgment portion 2212a confirms the state of the client 22a. When the judgment portion 2212a confirms that the client 22a is in a sleep state, the judgment portion 2212a performs a process for determining the power supply for electric power consumed by motors, solenoids, sensors and heaters of the fixing portion and the like that are installed in the image forming unit 222a, in order to output images. In other words, the judgment portion 2212a determines which of the power supply is used as a power supply, the power supply units 223a and 224a of the client 22a, or the power supply unit 224b of the client 22b in addition to the power supply units 223a and 224a of the client 22a. The data about outputting the images that has been received by the reception portion 2211a is temporarily stored in the storage portion 2217a.

And then, the judgment portion 2212a inquires about the electric power supply of the client 22b through the reception portion 2211a (step 202). Specifically, the judgment portion 2212a inquires of the client 22b whether or not the electric power supply through the cable CA11 and the HUB 12 is available. The client 22b judges whether or not the electric power supply is available (step 203). When the client 22b is in a standby state and therefore has surplus electric power, the client 22b informs the client 22a through the cable CA11 and the HUB 12 that the electric power supply is available. By performing such inquiry described above, the client 22b monitors whether or not the client 22a is in an insufficient state of electric power. However, without performing such inquiry described above, it may be considered that the client 22b monitors the client 22a. For example, the reception portion of the client 22b (corresponds to the reception portion 2211a of the client 22a (see FIGS. 5 and 6)) receives instructions of the image output that the reception portion 2211a of the client 22a (see FIG. 6) received through the cable CA11, and then the client 22b may judges whether or not electric power is in a insufficient state. In other words, it is possible to monitor the state of electric power by obtaining the same instructions of the image output.

Further, the judgment portion 2212a receives the instructions that the electric power supply is available, and then the judgment portion 2212a determines the power supply unit 224b of the client 22b as a power supply. In other words, the judgment portion 2212a requests the HUB 12 to supply electric power through the reception portion 2211a and the cable CA11 and then the HUB 12 instructs the control unit 221b of the client 22b through the cable CA11 to supply electric power. Furthermore, the judgment portion 2212a instructs the switch control portion 2213a to switch the switch SW22a to the contact point B, and then issues instructions to the switch SW12a and the switch SW32a. The switch control portion 2213a that has been instructed switches the switch SW22a to the contact point B, and turns the switch SW12a and the switch SW32a on (step 204), and then informs the judgment portion 2212a that the instructed operation has been done. The judgment portion 2212a instructs the client 22b to start supplying electric power through the reception portion 2211a, and then the client 22b that has been instructed starts supplying the surplus electric power from the power supply unit 224b through the cable CA13b (step 205).

In this case, electric power supplied through the cable CA13b is supplied to the image forming unit 222a through the switch SW22a. In addition, the image formation control portion 2215a instructs the image forming unit 222a to start outputting images through the communication portion 2216a. Then, the instructed image forming unit 222a starts outputting images (step 206).

Thereafter, when all of the instructed images are output, the image formation control portion 2215a informs the judgment portion 2212a that the instructed operation is done and finishes outputting the images (step 207). The judgment portion 2212a that was informed of the message informs the client 22b through the reception portion 2211a of stopping the electric power supply, and thereby the electric power supply from the power supply unit 224b of the client 22b is stopped (step 208). Thereafter, the process proceeds to step 217.

On the other hand, in the step 203, when the electric power supply from the client 22b through the cable CA13b is not available, the client 22b informs the client 22a through the cable CA11 and the HUB 12 that the electric power supply is not available. The judgment portion 2212a that has received the information determines to use the power supply units 223a and 224a of the client 22a as power supplies. Then, the judgment portion 2212a instructs the switch control portion 2213a to control the switch SW12a, the switch SW22a and the switch SW32a. In other words, the judgment portion 2212a instructs to turn the switch SW12a on, to switch the switch SW22a to the contact point A, and to turn the switch SW32a on. The instructed switch control portion 2213a turns the switch SW12a on (step 211), switches the switch SW22a to the contact point A (step 212), and turns the switch SW32a on (step 213). Thereby, electric power is supplied from power supply units 223a and 224a to the image forming unit 222a (step 214). When the switch SW22a is already switched to the contact point A, it is not necessary to switch the switch SW22a.

Thereafter, the same process that is described in the aforementioned step 206 is performed as the step 215, and then the same process that is described in the aforementioned step 207 is performed as the step 216.

When the output of the images is completed in the step 216, the judgment portion 2212a instructs the switch control portion 2213a to turn the switch SW12a and switch SW32a off. The switch control portion 2213a that has been instructed turns the switch SW12a off (step 217) and turns the switch SW32a off (step 218), and thereby suppresses the electric power consumption. Thus, a sequence of processes is completed.

In the exemplary embodiment, the case that electric power is supplied from the client 22b to the client 22a when the client 22a is in an insufficient state of electric power is described. It may be considered that the exemplary embodiment is also applied to the case that electric power is not available due to the breakdown of the power supply unit 224a of the client 22a. In other words, it is possible to temporarily replace the electric power supply to the image forming unit 222a of the client 22a from the power supply unit 224a of the client 22a with the electric power supply to the image forming unit 222a of the client 22a from the power supply unit 224b of the client 22b.

Third Exemplary Embodiment

Figure 8:
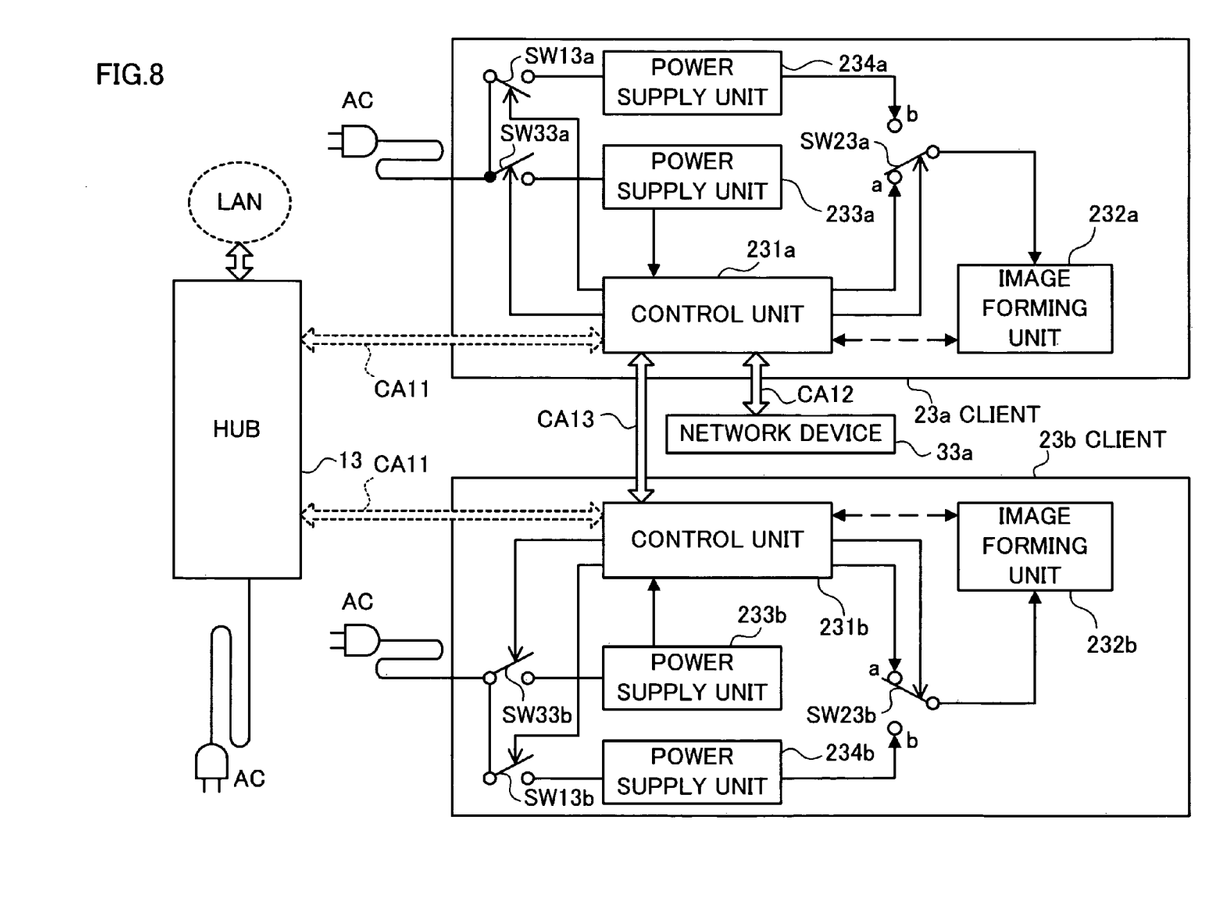
FIG. 8 is a block diagram illustrating a configuration of clients.

FIG. 8 is a block diagram illustrating configurations of clients 23a and 23b according to the third exemplary embodiment. The client 23a and the client 23b have the same configurations. Hence, reference numerals used in the same unit in the configuration are the same except for the character at the end. Hereinafter, the configuration of the client 23a will be described in detail, and the detailed description of the configuration of the client 23b will be omitted.

As shown in FIG. 8, the client 23a includes a control unit 231a, an image forming unit 232a, two power supply units 233a and 234a, and three switches SW13a, SW23a and SW33a. The switch SW13a is disposed on an input end of the power supply unit 234a. The switch SW23a has two contact points A and B. The switch SW33a is disposed on an input end of the power supply unit 233a. In addition, the switches SW13a, SW23a and SW33a are switched under the control of the control unit 231a.

In this case, solid-line arrows in the client 23a shown in FIG. 8 indicate power supply paths. Specifically, the power supply unit 233a supplies electric power to the control unit 231a. Further, the control unit 231a is connected to the contact point A of the switch SW23a. Thus, when the switch SW33a is turned on and the switch SW23a is switched to the contact point A by the control unit 231a, the power supply unit 233a supplies electric power to the image forming unit 232a through the control unit 231a. Furthermore, the power supply unit 234a is connected to the contact point B of the switch SW23a. Hence, when the switch SW13a is turned on and the switch SW23a is switched to the contact point B by the control unit 231a, electric power is supplied from the power supply unit 234a to the image forming unit 232a.

A broken-line arrow between the control unit 231a and the image forming unit 232a indicates a data communication path. Further, double-line arrow between the control unit 231a and the control unit 231b indicates the cable CA13 through which data is communicated and electric power is supplied. Furthermore, a broken double-line arrow between the control unit 231a and the HUB 13 indicates Ethernet (registered trademark) CA11. A double-line arrow between the control unit 231a and a network device 33a indicates the cable CA12 through which data is communicated and electric power is supplied.

Figure 9:
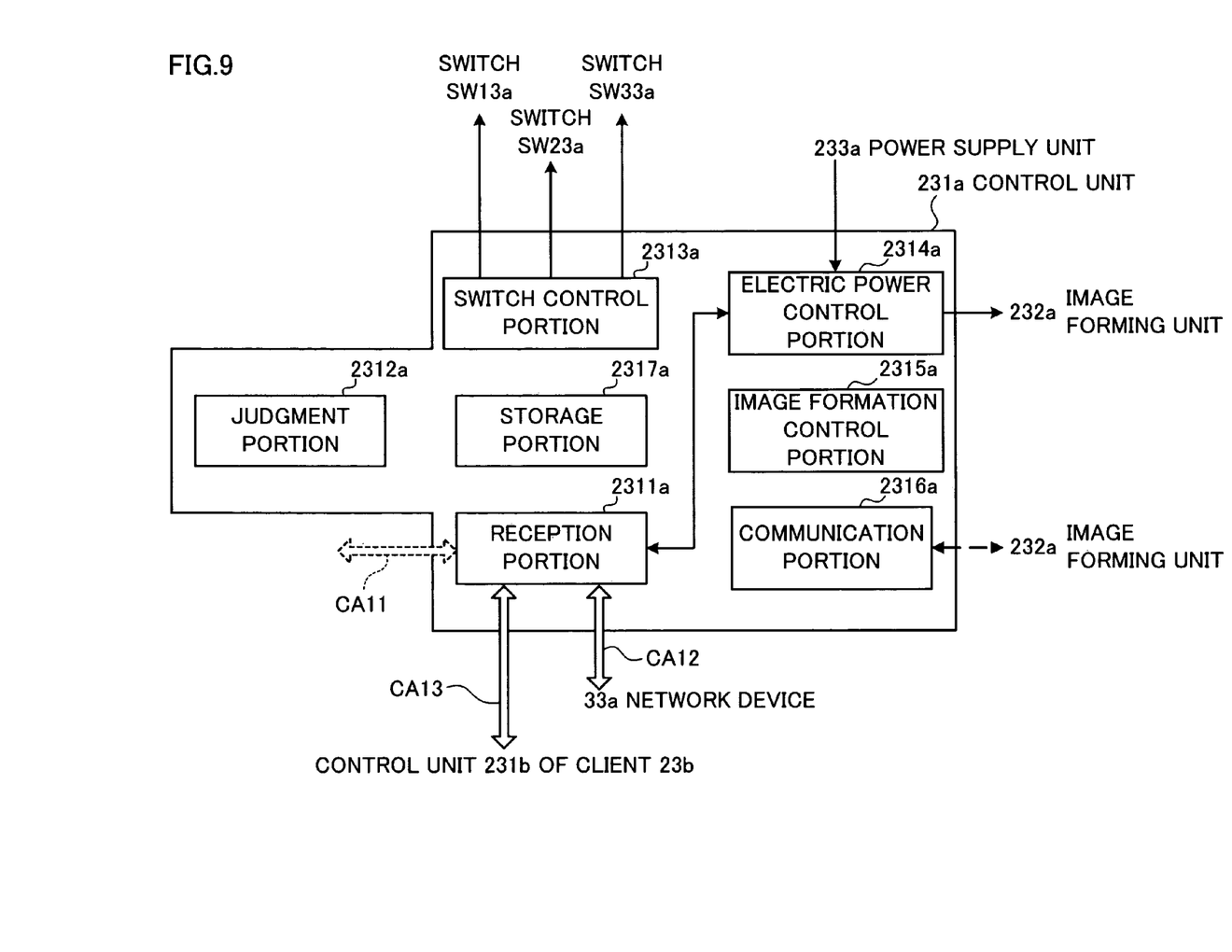
FIG. 9 is a block diagram illustrating a configuration of the control unit.

FIG. 9 is a block diagram illustrating a configuration of the control unit 231a. The control unit 231a and the control unit 231b have the same configurations. Therefore, detailed description of the configuration of the control unit 231b will be omitted.

As shown in FIG. 9, the control unit 231a may be configured as, for example, a CPU, a memory, or the like, and electric power is supplied from the control unit 231b of the client 23b to the control unit 231a through the power supply unit 233a or the cable CA13. In addition, the control unit 231a controls communicating with the HUB 13, or the other units, or controls operations of the image forming units 232a. Specifically, the control unit 231a includes a reception portion 2311a, a judgment portion 2312a, a switch control portion 2313a, an electric power control portion 2314a, an image formation control portion 2315a, a communication portion 2316a and a storage portion 2317a.

The reception portion 2311a sends information to external devices through the cable CA11, and receives information from external devices through the cable CA11. The reception portion 2311a also sends information and electric power to the control unit 231b of the client 23b (see FIG. 8) through the cable CA13, and receives information and electric power from the control unit 231b of the client 23b through the cable CA13 (sending and receiving electric power). Further, the reception portion 2311a sends information to the network device 33a through the cable CA12, and receives information from the network device 33a through the cable CA12. The reception portion 2311a supplies electric power to the network device 33a. The network device 33a does not have any one of an AC adaptor or a power supply, and is activated by electric power supplied through the cable CA12.

The judgment portion 2312a makes a predetermined judgment based on the information obtained from the reception portion 2311a and the communication portion 2316a, and then, issues instructions to the switch control portion 2313a or the other portions, and stores the judgment results in the storage portion 2317a, if necessary.

The switch control portion 2313a controls to turn the switches SW13a and SW33a (see FIG. 8) on and to turn the switches SW13a and SW33a off, and also controls to switch the switch SW23a (see FIG. 8) between the contact points A and B, based on the instructions of the judgment portion 2312a.

Electric power is supplied from the power supply unit 233a (see FIG. 8) to the electric power control portion 2314a based on the instructions of the judgment portion 2312a. Further, the electric power control portion 2314a controls whether electric power supplied from the power supply unit 233a is supplied to the client 23b through the cable CA13 or electric power supplied from the client 23b through the cable CA13 is supplied to the image forming unit 232a, based on the instructions of the judgment portion 2312a.

The image formation control portion 2315a controls the image forming unit 232a through the communication portion 2316a based on the instructions of the judgment portion 2312a. Further, the communication portion 2316a sends information to the image forming unit 232a and receives information from the image forming unit 232a. Then, if necessary, the communication portion 2316 sends the received information to the image formation control portion 2315a or the judgment portion 2312a. The storage portion 2317a stores any information, or reads stored information to send it to the judgment portion 2312a, based on the instructions of the judgment portion 2312a.

Figure 10:
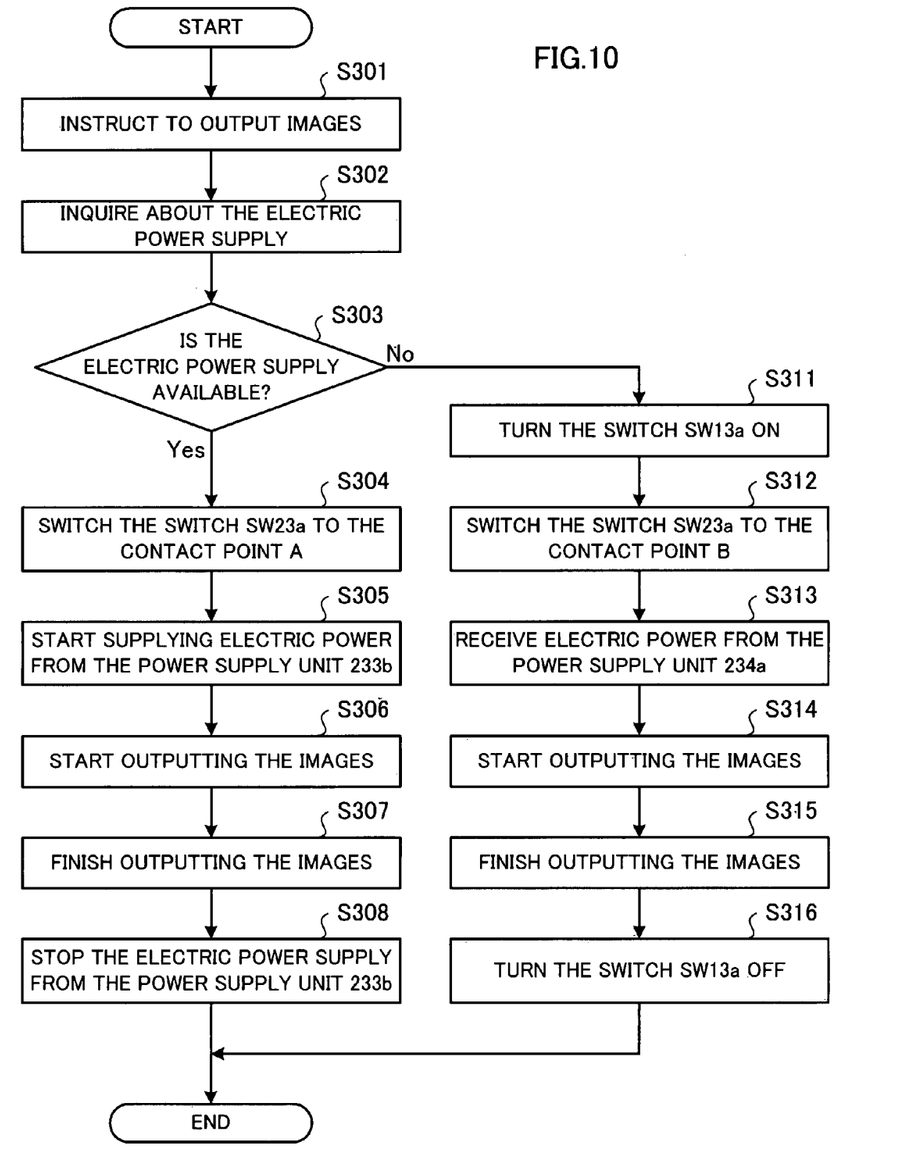
FIG. 10 is a flowchart illustrating a process sequence in the clients.

FIG. 10 is a flowchart illustrating a process sequence in the clients 23a and 23b.

The client 23a is in a so-called sleep state, since the power supply unit 233a is on and the power supply unit 234a is off. In other words, the switch SW33a is on and the switch SW13a is off. When the switch SW33a is off, it may be considered that electric power is supplied from the control unit 231b of the client 23b to the control unit 231a through the cable CA13.

Further, the client 23b is in a so-called standby state, since the power supply unit 233b is on and the power supply unit 234b is on. That is, the client 23a is in a state in which the client 23a does not immediately output images, and the client 23b is in a state in which the client 23b immediately outputs images. Even when the client 23a is in a sleep state, the client 23a performs the electric power supply to the network device 33a. Hence, in the client 23a, the case in which electric power to be supplied to the image forming unit 232a is insufficient may be frequently occurred.

In such a state, when the reception portion 2311a of the client 23a (see FIG. 9) receives instructions to output images through the cable CA11 (step 301), the reception portion 2311a sends the instructions to the judgment portion 2312a. Then, the judgment portion 2312a confirms the state of the client 23a. When the judgment portion 2312a confirms that the client 23a is in a sleep state, the judgment portion 2312a performs a process for determining the power supply for electric power consumed by motors, solenoids, sensors and heaters of the fixing portion and the like that are installed in the image forming unit 232a, in order to output images. In other words, the judgment portion 2312a determines which of the power supply is used as a power supply, the power supply unit 234a of the client 23a, or the power supply unit 233b of the client 23b. The data about outputting the images that has been received by the reception portion 2311a is temporarily stored in the storage portion 2317a.

Hence, the judgment portion 2312a inquires about the electric power supply of the client 23b through the reception portion 2311a (step 302). Specifically, the judgment portion 2312a inquires of the client 23b whether or not the electric power supply through the cable CA13 is available. The client 23b judges whether or not the electric power supply is available (step 303). When the client 23b is in a standby state and therefore has the surplus electric power, the client 23b informs the client 23a through the cable CA13 that the electric power supply is available.

Also, the judgment portion 2312a that has received the information that the electric power supply is available determines the power supply unit 233b of the client 23b as a power supply. In other words, the judgment portion 2312a requests the control unit 231b of the client 23b to supply electric power through the reception portion 2311a and through the cable CA13. Further, the judgment portion 2312a instructs the switch control portion 2313a to switch the switch SW23a to the contact point A. The instructed switch control portion 2313a switches the switch SW23a to the contact point A (step 304), and then informs the judgment portion 2312a of the message that the instructed operation has been done. The judgment portion 2312a instructs the client 23b to start supplying electric power through the reception portion 2311a, and then the client 23b that has been instructed starts supplying the surplus electric power of the power supply unit 233b through the cable CA13 (step 305).

In this case, electric power supplied through the cable CA13 is transmitted to the electric power control portion 2314a from the reception portion 2311a, and then, electric power is supplied to the image forming unit 232a. In addition, the image formation control portion 2315a instructs the image forming unit 232a to start outputting images through the communication portion 2316a. Then, the instructed image forming unit 232a starts outputting images (step 306).

Thereafter, when all of the instructed images are output, the image formation control portion 2315a informs the judgment portion 2312a that the instructed operation is done and finishes outputting the images (step 307). The judgment portion 2312a that has received the information informs the client 23b through the reception portion 2311a of stopping the electric power supply, and thereby the electric power supply from the power supply unit 233b of the client 23b is stopped (step 308).

On the other hand, in the step 303, when the electric power supply from the client 23b through the cable CA13 is not available, the client 23b informs the client 23a through the cable CA13 that the electric power supply is not available. The judgment portion 2312a that has received the information determines to use the power supply unit 234a of the client 23a as power supply. Then, the judgment portion 2312a instructs the switch control portion 2313a to control the switch SW13a and the switch SW23a. In other words, the judgment portion 2312a instructs to turn the switch SW13a on, and to switch the switch SW23a to the contact point B. The instructed switch control portion 2313a turns the switch SW13a on (step 311), and switches the switch SW23a to the contact point B (step 312). Thereby, electric power is supplied from the power supply unit 234a to the image forming unit 232a (step 313). When the switch SW23a is already switched to the contact point B, it is not necessary to switch the switch SW23a.

Thereafter, the same process that is described in the aforementioned step 306 is performed as the step 314, and then the same process that is described in the aforementioned step 307 is performed as the step 315.

When the output of the images is completed in the step 315, the judgment portion 2312a instructs the switch control portion 2313a to turn the switch SW13a off. The switch control portion 2313a that has been instructed turns the switch SW13a off (step 316), and thereby suppresses the electric power consumption. Thus, a sequence of processes is completed. The judgment portion 2312a may instruct the switch control portion 2313a to turn the switch SW33a off. In this case, electric power is supplied to the control unit 231a from the control unit 231b of the client 23b through the cable CA13.

Herein, the various processes described in the exemplary embodiments are embodied by an application program executed by using storage portions 2117a, 2217a, 2317a as working memories of the clients 21a, 22a, and 23a. When the clients 21a, 22a, and 23a (i.e. computers) are provided to customers (including users), the application program may be provided to the customers as the application program installed in a computer. In addition, a computer readable medium storing the program to be executed in the computer may be provided. The computer readable medium includes, for example, a CD-ROM or the like. The program is read and executed by a CD-ROM readable device (not shown in figures) or the like. The program may be provided, for example, by passing through a network interface via a network by a program transmitting device (not shown in figures). The program transmitting device, for example, has a memory that is disposed in the clients 21a, 22a, and 23a and stores the program, and a program transmitting unit providing the program through the network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electric power supply system comprising:
a first terminal that electric power is supplied thereto from a first power supply to operate, the first terminal having an output;
a device connected to the output of the first terminal;
a second terminal that is connected to the first terminal and that electric power is supplied thereto from a second power supply to operate; and
a controller that controls electric power supply so as to supply electric power from the first terminal to the second terminal, and from the second terminal to the first terminal, based on an operation state of the first terminal, the controller having a judgment section configured to determine if power sharing is necessary based on consumption of power by motors, solenoids, sensors and heaters of the device connected to the first terminal, wherein
the controller is located within the device connected to the output of the first terminal, and
the device connected to the first terminal is in a sleep mode, and a device connected to the second terminal is in a standby mode.

2. The electric power supply system according to claim 1, wherein the controller controls the electric power supply so as to supply electric power to the second terminal based on instructions of the electric power supply by an external device connected to the first terminal.

3. The electric power supply system according to claim 1, wherein the first terminal monitors whether or not the second terminal is in an insufficient state of electric power, and
the controller controls the electric power supply based on the results monitored by the first terminal.

4. The electric power supply system according to claim 1, wherein the controller controls the electric power supply so as to supply electric power from the first terminal to the second terminal when the first terminal is in a low consumption state of electric power.

5. The electric power supply system according to claim 1, wherein the second terminal is connected to the first terminal through a communication line and a power supply line.

6. The electric power supply system according to claim 1, wherein the first terminal and the second terminal are image forming apparatuses, and
the controller controls the electric power supply so as to supply electric power from the first terminal to the second terminal when the second terminal starts up.

7. A terminal comprising:
a power supply;
a judgment unit that judges whether or not electric power supply from the power supply is available and judges if power sharing is necessary based on consumption of power by motors, solenoids, sensors and heaters of a connected device; and
a controller that controls the electric power supply so as to supply electric power from the power supply to the connected device, and from the connected device to the terminal, based on the results judged by the judgment unit, wherein
the controller is located within the connected device, and the terminal is in a standby mode and the connected device is in a sleep mode.

8. The terminal according to claim 7, wherein the controller controls the electric power supply so as to supply electric power from the power supply to the connected device, based on the results judged by the judgment unit in response to instructions of the electric power supply by an external device connected to the terminal.

9. The terminal according to claim 7 further comprising a monitor unit that monitors whether or not the connected device is in an insufficient state of electric power, wherein
the controller controls the electric power supply based on the results monitored by the monitor unit.

10. The terminal according to claim 7, wherein the controller controls the electric power supply so as to supply electric power to the connected device when the judgment unit judges that the terminal is in a low power consumption state.

11. A terminal comprising:
a power supply;
a judgment unit that judges whether or not the amount of electric power consumption exceeds electric power supplied from the power supply; and
a request unit that requests a connected device to supply electric power, and supply power from the terminal to the connected device, based on the results judged by the judgment unit, the results being consumption of power by motors, solenoids, sensors, and heaters of the connected device, wherein
the request unit is located within the connected device, and the terminal is in a standby mode and the connected device is in a sleep mode.

12. The terminal according to claim 11, wherein the terminal is connected to the connected device through a communication line and a power supply line.

13. The terminal according to claim 11, wherein the terminal and the connected device are image forming apparatuses, and
the judgment unit judges that the amount of the electric power consumption exceeds the amount of the electric power supplied from the power supply when the terminal starts up.

14. An electric power supply method comprising:
supplying electric power to a first terminal with an output and at least one device connected to the output;
operating the first terminal with the supplied electric power;
supplying electric power to a second terminal that is connected to the first terminal;
operating the second terminal with the supplied electric power;
controlling electric power supply from the at least one device connected to the output of the first terminal, so as to supply electric power from the first terminal to the second terminal, and from the second terminal to the first terminal, based on an operation state of the first terminal, and
judging whether power sharing is necessary based on consumption of power by motors, solenoids, sensors and heaters of a device connected to the second terminal, wherein the at least one device connected to the output of the first terminal is in a standby mode and the device connected to the second terminal is in a sleep mode.

15. A non-transitory computer readable medium storing a program causing a computer to execute a process for electric power supply of the computer that includes a terminal equipped with a power supply and that is connected to a connected device through a power supply line, the process comprising:
judging whether or not the electric power supply by the power supply is available and judging if power sharing is necessary based on consumption of power by motors, solenoids, sensors and heaters of the connected device; and
controlling from the connected device the electric power supply so as to supply electric power from the power supply to the connected device, and supply power from the connected device to the terminal, based on the judgment results, wherein the terminal is in a standby mode and the connected device is in a sleep mode.

16. The computer readable medium according to claim 15, wherein the controlling process controls the electric power supply so as to supply electric power from the power supply to the connected device based on the judgment results, in response to instructions of the electric power supply by an external device connected to the terminal.

17. The computer readable medium according to claim 15, the process further including monitoring whether or not the connected device is in an insufficient state of electric power, wherein
the controlling process controls the electric power supply based on the monitored results.

18. The computer readable medium according to claim 15, wherein the controlling process controls the electric power supply so as to supply electric power to the connected device when the judging process judges that the terminal is in a low consumption state of electric power.

19. A non-transitory computer readable medium storing a program causing a computer to execute a process for electric power supply of the computer that includes a terminal equipped with a power supply and that is connected to a connected device through a power supply line, the process comprising:
judging whether or not insufficient electric power supply from the power supply occurs and judging if power sharing is necessary based on consumption of power by motors, solenoids, sensors and heaters of the connected device; and
requesting, from a controller in the connected device, that the connected device to supply electric power, and supply electric power from the terminal to the connected device, based on the judgment results, wherein the terminal is in a standby mode and the connected device is in a sleep mode.

20. The computer readable medium according to claim 19, wherein the judging process judges that the insufficient electric power supply from the power supply occurs when the terminal starts up.

* * * * *